J. B. KNIEST.
SELF-WATERING DEVICE FOR FLOWER-STANDS, BASKETS, &c.

No. 180,242. Patented July 25, 1876.

WITNESSES:
Frank Hirsch
Wm. P. Stark.

INVENTOR:
John B. Kniest
by Michael J. Stark
his attorney.

UNITED STATES PATENT OFFICE.

JOHN B. KNIEST, OF BUFFALO, NEW YORK.

IMPROVEMENT IN SELF-WATERING DEVICES FOR FLOWER-STANDS, BASKETS, &c.

Specification forming part of Letters Patent No. 180,242, dated July 25, 1876; application filed June 12, 1876.

*To all whom it may concern:*

Be it known that I, JOHN B. KNIEST, of Buffalo, in the county of Erie and State of New York, have invented a Self-Watering Device for Flower Stands, Baskets, and Vases; and I do hereby declare that the following description, taken in connection with the accompanying sheet of drawings, forms a full, clear, and exact specification.

The object of my invention is the production of an automatically-acting device for watering flower-pots, vases, and flower-baskets; and it consists in the arrangement, with a flower stand, vase, or basket, of a water-reservoir having a valve in its bottom, and placed into a shallow pan, said pan being in communication with one or more similar pans, wherein the flower-pots to be watered are placed and supplied with the necessary water automatically as the same is absorbed by the said flower-pots, or as it evaporates from exposure. My invention furthermore consists in the arrangement of parts and details of construction, as will hereinafter more fully appear.

In order to enable others skilled in the art to which my invention appertains to make and use the same, I shall proceed to describe its particulars, and thereby refer to the hereinbefore-mentioned drawings, which form a part of this specification, and illustrate my said invention more fully.

Figure 1:
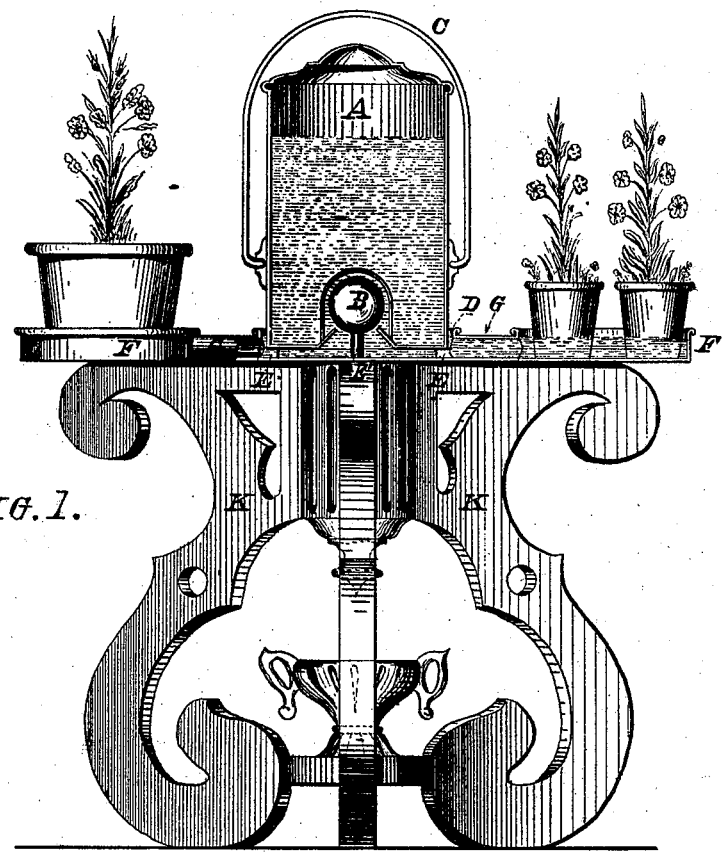
Figure 2:
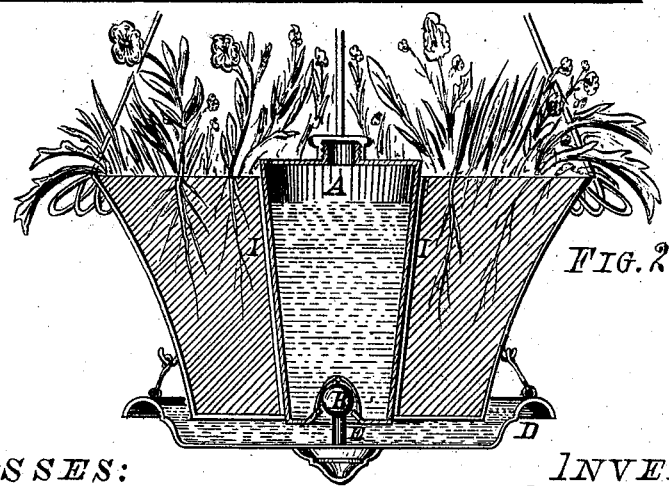

In these drawings, Figure 1 is a longitudinal sectional elevation of my improved flower-stand and its appurtenants. Fig. 2 is a similar view of a hanging flower-basket, showing the arrangement of my self-watering device as applied to that class of flower-plant receptacles.

Letters of a similar character refer to corresponding parts in both figures.

A is the water-reservoir, constructed of any suitable material, metal, or stoneware. It is provided in its base with an aperture, centrally closed by a valve, B, consisting either of a ball, or similar well-known means for checking the flow of liquids. This reservoir is made air-tight above its base, and has no communition with the exterior, save through the hereinbefore-mentioned aperture. To render this reservoir portable, I provide the same with a bail, C, by means of which it can be conveniently carried about. The reservoir A is placed into a dish-shaped or shallow pan, D, being in size slightly larger than the diameter of said reservoir, upon projections E, to keep it a distance above the bottom of the pan D, as hereinafter to be explained. Centrally within the pan D is another projection, E', of such a height that when the reservoir A is placed into this pan, said projection will come in contact with the valve B, and elevate the same sufficiently to allow of a limited discharge of the contents of said vessel A. F are a series of pans or saucers, arranged around the central pan D, and connected therewith by the pipes G. Within these latter pans are placed the flower-pots whose contents are desired to be kept in a moist state.

The action of my improved self-watering device is as follows, to wit: The vessel or reservoir A, being filled with water through the funnel-shaped aperture in its bottom, is placed inversely into the pan D. To prevent the exit of water during this operation, said aperture is closed by the valve B, and this is opened by coming in contact with the projection E', to allow a part of its contents to escape into the pan D, and through the branches G into the pans F, filling the same to a height slightly above the base of the reservoir A. As soon as the level of the water reaches the said base the communication of the atmosphere with the interior of the vessel A is interrupted, and, this vessel being thus hermetically sealed, will only allow so much more water to escape to cause a rarefaction of the air in its interior, which will tend to support the column of liquid by the action of the atmosphere, and thereby prevent a further flow until, by absorption and evaporation, sufficient water has escaped to expose the exit-opening, when the same action heretofore described will be repeated automatically until the contents of the reservoir A are exhausted. The flower-pots standing in the water in pans F will absorb the water by capillary attraction, and thus cause their contents to be preserved in a healthy condition.

In order to apply the principle governing the action of my self-watering apparatus to flower-vases and hanging-baskets, I provide these with a water-pan similar to pan D, heretofore described, and shown in Fig. 2, and place the reservoir A into the earth or soil contained in such vases, &c. In this case, however, I prefer to provide the reservoir with a jacket, I, to enable the insertion and withdrawal without disturbing the soil or the roots of the plants. In action this device is identical with that heretofore described, as soon as the basket or lower part of the vase dips into the receptacle D to absorb the water. Instead of the projections E to support the reservoir at its proper height, the jacket I is fitted to obtain the desired result.

In outdoor places, especially burying-grounds, a perfect self-acting watering flower-pot, &c., arrangement is a great desideratum, and my improvements are especially adapted to supply this long-felt want. The water-reservoir, being portable, can be easily carried to a pump, stream, or pond, and filled; and it contains a sufficiency of water to last for a long space of time, thus saving a great deal of annoyance and trouble in keeping flowers in pots and vases, &c., in a healthy condition.

It is obvious that my improvements are also applicable to flower-stands in which the pots are arranged in terraces, and that, by making the pans or saucers of a sufficiently large diameter and proper shape, a number of pots may be placed into the same, thus retaining all the advantages of the common flower-stand.

Having thus fully described my invention, I desire to secure to me by Letters Patent of the United States—

1. The hereinbefore-described automatically-acting watering device for flower stands, vases, and baskets, consisting of a water-reservoir provided with a water-outlet in its base, and hermetically sealed above, and a shallow pan, within which said reservoir is placed a suitable distance from its bottom, whereby the supply of water is controlled automatically, substantially as described.

2. The hereinbefore-described flower-stand and automatic water-supply arrangement, consisting of a suitable support, a series of shallow pans or saucers connected by pipes to a central pan, and a water-supply reservoir, the whole being constructed and arranged in the manner and for the use and purpose stated.

3. The combination, with the hermetically-sealed tank A, provided with the valve B in its outlet-passage in the bottom of the pan D, central projection E', and the projections E, substantially as described, for the use and purpose stated.

In testimony whereof I have hereto set my hand in the presence of two subscribing witnesses.

J. B. KNIEST.

Witnesses:
 MICHAEL J. STARK,
 FRANK HIRSCH.